Sept. 10, 1940.  M. B. MARSHALL, JR  2,214,640
CONTROL DEVICE
Filed Jan. 4, 1940
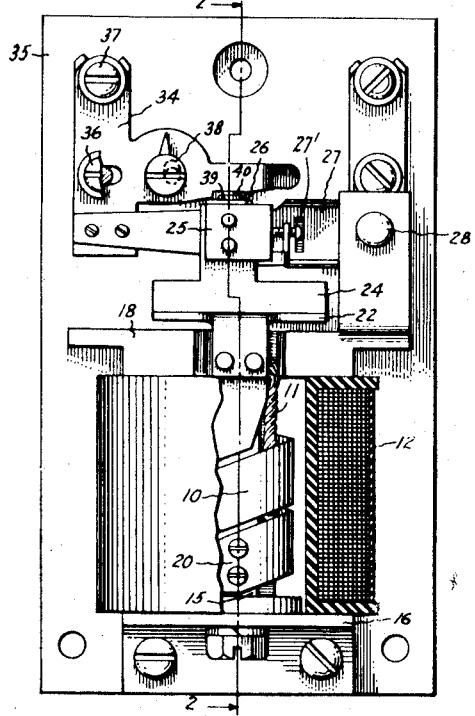
Fig. 1.
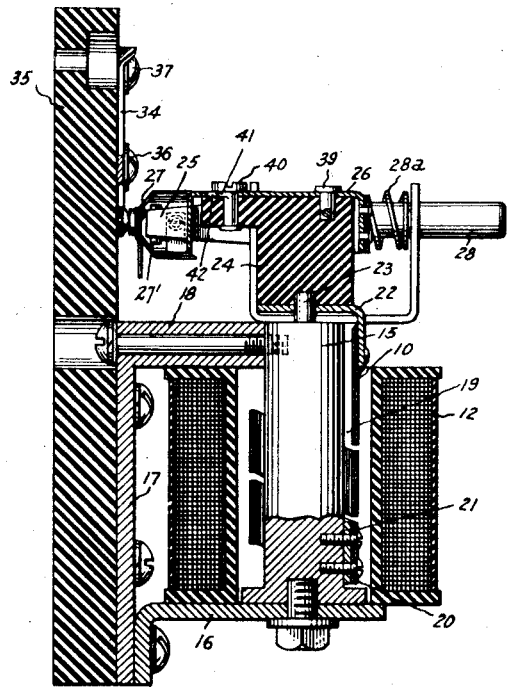
Fig. 2.
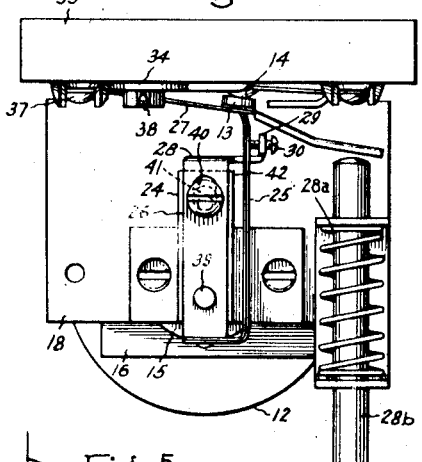
Fig. 3.
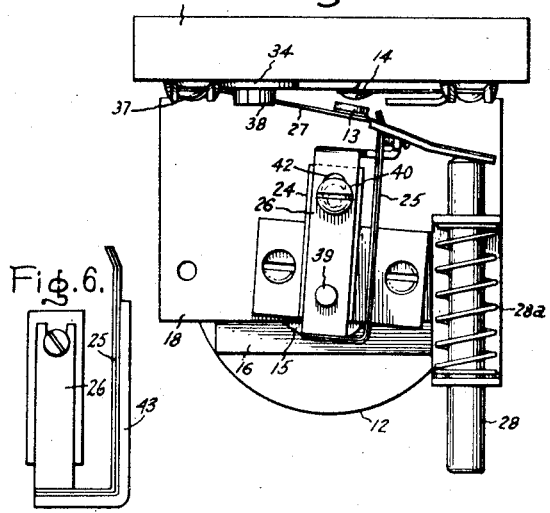
Fig. 4.
Fig. 6.
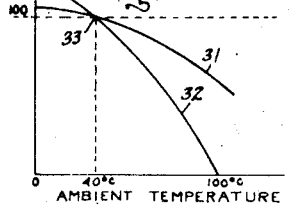
Fig. 5.
Inventor
Myron B. Marshall, Jr.
by Harry E. Dunham
His Attorney.

Patented Sept. 10, 1940

2,214,640

UNITED STATES PATENT OFFICE 2,214,640

CONTROL DEVICE

Myron B. Marshall, Jr., St. Albans, N. Y., assignor to General Electric Company, a corporation of New York Application January 4, 1940, Serial No. 312,413

9 Claims. (Cl. 200—122)

My invention relates to control devices, more particularly to current responsive thermal overload protective relays for electric apparatus, especially electric motors, and has for its object a simple and reliable control device which is compensated for changes in ambient temperature over a predetermined temperature range.

In carrying out my invention in one form, I provide means for restricting the movement of an ambient temperature compensating thermostat in its cold direction so that it is free to compensate only for ambient temperatures above the temperature at which its movement is restricted. For lower temperatures, the device is uncompensated for ambient temperature change.

Preferably the temperature at which the compensation ceases is that temperature, such as 40 degrees C., at which the ambient temperature thermostat actually does not introduce any correction. As a result the device, because of its lack of compensation, is made less sensitive to current at lower temperatures while for the higher temperatures, the compensation renders it less sensitive to current. Therefore, the device operates under its least current sensitive conditions throughout its temperature range, whereby the motor protected by it is permitted to operate with its maximum current values.

For a more complete understanding of my invention, reference should be had to the accompanying drawing in which Fig. 1 is an elevation view of a thermal relay embodying my invention; Fig. 2 is a sectional view taken along the line 2—2 of Fig. 1 looking in the direction of the arrows; Fig. 3 is a plan view of Fig. 1 showing the contacts of the relay in circuit closed position; Fig. 4 is a view similar to Fig. 3 but showing the contacts open after operation of the thermostat; Fig. 5 shows curves of the operation of a typical device plotted with current in the coil 12 expressed as per cent of full load current as ordinates and ambient temperature as abscissae, while Fig. 6 is a fragmentary view of a modified form of my invention.

Referring to the drawing, I have shown my invention in one form as applied to a thermally operated control device such as described and claimed in co-pending application of Benjamin W. Jones, Serial No. 276,823, filed June 1, 1939, assigned to the same assignee as this invention.

The device comprises a helically wound bimetallic thermostatic strip 10 having its ends electrically connected together through a flexible conductor 11, shown as a stranded conductor, so as to form a short circuited secondary winding for an inducing coil 12 closely surrounding it. It will be understood that the coil 12 is provided with suitable terminals by means of which the coil is connected in the circuit to be controlled, such as a motor circuit, so that it is energized in accordance with the current in the circuit to be controlled. Also the coil 12 may be energized through a suitable current transformer means (not shown) to which the coil is connected. In the event of an excessive current, i. e., overload, in the coil 12, the thermostat is heated to such a temperature by the high current induced in it that it flexes sufficiently to release a movable contact 13 cooperating with the stationary contact 14 and thereby opens the controlled circuit which may be the circuit of an electric motor.

The arrangement of the bimetallic thermostat 10 as the short circuited transformer secondary winding of a primary inducing coil 12 provides for the heating of the thermostat to a temperature much higher than the temperature of the adjacent parts. In order that the thermostat may be cooled quickly after operation, it is associated closely with a member or leg 15 made of magnetic material and forming a part of the magnetic core for the coil 12, which leg provides a reservoir for the storage of the heat generated in the thermostat. This leg 15 cooperates with the other legs 16, 17 and 18 to form a magnetic core for the coil 12. As shown, the leg 15 is cylindrical and of nearly the same diameter as the cylindrical helix 10, the leg being sufficiently smaller than the helix to provide a small air space 19 between the two for electrical insulation purposes, and the thermostat 10 being wound flatwise with respect to said leg. This space 19 however is small enough so that the thermostat is in good thermal relation with the core leg 15 and the heat of the thermostat is transferred rapidly across this space to the leg by radiation and convection.

As shown, the thermostat has its lower end 20 rigidly secured as by screws and solder in good thermal relation to the lower end of the leg 15, a metal spacing member 21 being provided between them. The upper end of the thermostat is secured to the down turned projection of a member 22 which member extends across the upper end of the leg and is pivoted on a pivot pin 23 secured to the leg and extending lengthwise therewith coincident with the longitudinal center line of the leg 15. The member 22 and the parts secured to it are supported by the thermostat and are turned about the pin 23 by movement of the upper end of the thermostat in response to its flexure caused by changes in temperature.

A block of electrically insulating material 24 is secured on the member 22. This block carries a second bimetallic thermostat 25 having one end bent at right angles and secured to the down turned end of a strip 26 which is secured to the top of the block and extends in parallel relation with the block and with the thermostat 25. The thermostat 25 has its main substantially straight portion extending at right angles with the axis of the helix 10. The opposite end of this thermostat 25 is free to move and normally is in abutting relation with a transversely extending flexible arm 27 carrying the movable contact 13. This arm 27 is provided with an aperture 27' into which the end of the thermostat 25 moves to release the arm 27 in response to predetermined temperature. In other words, the helical thermostat, upon an increase in temperature, flexes in a direction to unwind itself so that the support 24 and the thermostat 25 are moved in a clockwise direction, as seen in Fig. 3, about the pivot pin 23.

The bimetallic thermostatic strip 25 is furthermore so arranged as to act as a compensator for changes in atmospheric or ambient temperature. Thus, when the thermostat 10 unwinds upon an increase in ambient temperature, the thermostat 25 substantially offsets this movement by flexing in a direction tending to move its free end toward the left hand, as seen in Fig. 3, so that the end of the thermostat 25 does not move on the switch arm 27 in response to ambient temperature changes.

When the contact arm 27 is released, as seen in Fig. 4, it may again be moved to the closed circuit position by pressing the button 28b which is biased to the position shown by the spring 28a. Preferably this is done after the short interval of a second or more required for the thermostat 10 to be cooled sufficiently for the free end of the thermostat 25 to hold the switch arm 27 in its closed position.

In accordance with my invention, I provide an extension 28 on the strap 26 on its end and opposite the end to which the thermostat 25 is secured, this extension being arranged to form an abutment and limit the movement of the thermostat 25 in its cooling direction. As shown, the extension 28 extends downward at the end of the insulating block 24 and then toward the right-hand as viewed in Fig. 3 underneath the thermostat 25. At its end it carries a projection 29 extending upward behind the thermostat 25 and provided with an adjustable stop screw 30.

This screw 30 is on the side of the thermostat 25 toward which it moves when its temperature is reduced and the screw therefore serves to limit its movement after it has cooled to a predetermined temperature which is determined by the adjustment of the screw. Preferably the screw is adjusted so that the thermostat engages it at the temperature at which the ambient temperature compensated curve 31, Fig. 5, and the ambient temperature uncompensated curve 32 cross each other. This temperature is indicated on Fig. 5 by the point 33 which in a particular device was at 40° C. ambient and 100 per cent load current. At this temperature the thermostat 25 as indicated by the crossing of the curves does not introduce any compensation for the ambient temperature, the ambient temperature compensated and uncompensated current values being the same. For lower temperatures, it will be observed that the curve 32 indicates a higher motor operating current allowed without ambient temperature compensation. In view of the fact that the screw prevents the thermostat 25 from adjusting the device to follow the curve 31 after the point 33 is reached, the device operates on the curve 32, i. e., without ambient temperature compensation, for the lower temperatures.

It will be observed that the motor is thus permitted by the device to operate with the maximum current values afforded by the ambient temperature compensated and uncompensated conditions indicated by the two curves 31 and 32. This has the advantage of providing the greatest possible horsepower output from the motor afforded by each of these two conditions of operation.

As shown, the left-hand end of the contact arm 27 is secured to an adjustable plate 34. This plate 34 is secured to the insulating base 35, supporting other parts of the relay, by means of a screw 36. An elongated hole is provided in the plate 34 for the screw 36 so that the plate 34 may be moved toward the right or left hand as seen in Fig. 1 by turning the cam member 38 having its inner end pivoted in the base 35 to thereby adjust the position of the arm 27 and contact 13 with respect to the thermostat 25. This adjusts the current setting of the device. Electrical connection with the contact arm 27 is made by a terminal screw 37 on the plate 34.

Also, as shown, the supporting strip 26 to which one end of the compensating thermostat 25 is secured, is mounted on the block 24 for adjustment with respect thereto. As shown, the strip 26 is secured to the block on a pin 39 and may be turned about this pin by turning a rivet or bolt 40, the bolt being provided with a cam 41 which cooperates with the sides of a slot 42 in the end of the strip 26. Preferably this is a factory adjustment. For example, the thermostat 10 may be heated to a predetermined temperature as by immersing it in hot water and the thermostat 25 then adjusted by turning the bolt 40 until the end of the thermostat just slips off of the switch arm 27 allowing the relay to trip and open the contacts as shown in Fig. 4. The bolt is then preferably secured permanently as by soldering its head to the strip 26. The purpose of this factory adjustment is to assure that the cam screw 38 normally will be in an approximately intermediate position to provide for a substantial range of adjustment each way from the intermediate position.

This relay has the advantage that it may be adjusted for motors of various sizes by simply providing a coil 12 having a suitable number of turns. It is contemplated that the coil will be a current coil and connected directly in the circuit of the motor which is protected by the relay. It will, therefore, have a relatively few turns.

The block 24 of electrically insulating material serves also as a thermal insulator whereby the thermostat 25 is thermally insulated from the thermostat 10.

This relay has also the advantage that it gives protection for the motor under stalled rotor conditions as well as under running load conditions. To this end the magnetic core 15 is made of such small cross section that it is magnetically saturated to delay the rate of heating of the thermostat 10 for the higher currents. It will be understood that when the core 15 is saturated, or partially saturated, the magnetic flux through it does not increase in proportion to the current in the coil 12 and, consequently, the current induced in the thermostat 10, which is proportional to the magnetic flux in the core 15, does not increase in proportion to the current in the coil 12. For example, certain types of electric motors, when energized with their rotors stalled, carry approximately eight times their rated current, i. e., eight times their maximum permissible current. Under stalled rotor conditions, a motor of this type requires somewhat over 25 seconds to be heated to a temperature high enough to damage it. In a typical relay, the core 15 was made of such cross section that it was substantially saturated magnetically under stalled rotor motor conditions, i. e., with eight times the maximum permissible motor current, and the thermostat 10 operated to release the switch arm 13 and thereby deenergize the motor in about 25 seconds under this stalled rotor condition. This relay also gave very desirable protection against motor running overloads and was found to substantially duplicate or simulate the thermal conditions of the motor in that the thermostat 10 was heated to its maximum temperature sufficient to release the switch arm 27 in substantially the same time required for the hottest part of the motor, i. e., the copper, to reach a maximum permissible temperature.

In the modified form of my invention, shown in Fig. 6, the strap 26 is not provided with an extension 28 as shown in Figs. 1 to 4 inclusive. Instead, a strap 43 is provided for limiting the movement of the thermostat in its cooling direction. This strap 43 has one end secured to the strap 26 on the outside of the thermostat and extends in parallel relation with the thermostat. It is furthermore shaped so that when the thermostat is cooled to the predetermined temperature, it engages the strap 43, as shown, which prevents further deflection of the end of the thermostat toward the right hand.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. A control device comprising a temperature responsive device, current responsive means for heating said device, circuit controlling means operated by movement of said device, a second temperature responsive device cooperating with said first device so as to compensate substantially the movements of said first device for changes in ambient temperature, and means for limiting the movement of said second device to provide for uncompensated movement of said first device over a predetermined ambient temperature range.

2. A control device comprising a temperature responsive device, current responsive means for heating said device, circuit controlling means operated by movement of said device in response to a predetermined current, a second temperature responsive device cooperating with said first device so as to compensate substantially the movements of said first device for changes in ambient temperature, and means for limiting the movement of said second device to provide for uncompensated movement of said first device over a predetermined ambient temperature range, said means being arranged to limit the movement of said second device at the ambient temperature at which the compensated and uncompensated operating current values for said first device are substantially equal.

3. A control device comprising a temperature responsive device, current responsive means for heating said device, circuit controlling means operated by movement of said device, a second temperature responsive device cooperating with said first device so as to compensate the movements of said first device for changes in ambient temperature, and means for limiting the movement of said second device in a cooling direction at a predetermined ambient temperature to provide for uncompensated movement of said first device at lower temperatures in the operation of said circuit controlling means.

4. A control device comprising a current responsive bimetallic thermostat, circuit controlling means operated by movement of said thermostat, a second bimetallic thermostat cooperating with said first thermostat so as to compensate substantially the movements of said first thermostat for changes in ambient temperature, and means for limiting the movement of said second thermostat in a cooling direction at a predetermined ambient temperature to provide for uncompensated ambient temperature movement of said first thermostat at lower temperatures in the operation of said circuit controlling means.

5. A control device comprising a temperature responsive device, current responsive means for heating said device, a second temperature responsive device carried by said first temperature responsive device and arranged to compensate substantially the movements of said first device for changes in ambient temperature, circuit controlling means operated by said second temperature responsive device, and means carried by said first device for limiting the movement of said second device to provide for uncompensated ambient temperature movement of said first device.

6. A thermal relay comprising a current responsive bimetallic thermostat, a second bimetallic thermostat carried by said first thermostat and arranged to compensate substantially the movements of said first thermostat for changes in ambient temperature, circuit controlling means operated by said second thermostat, and means carried by said first thermostat for limiting the movement of said second thermostat in a cooling direction at a predetermined ambient temperature to provide for uncompensated ambient temperature movement of said first thermostat at lower temperatures in the operation of said circuit controlling means.

7. A control device comprising a thermally responsive element, current responsive means for heating said element, a member formed of bimetallic thermostatic material operated by said element, circuit controlling means operated by said member, said member being arranged to be distorted by changes in ambient temperature to offset movement of said element in response to changes in ambient temperature, and means cooperating with said member at a predetermined low ambient temperature to limit its movement in a cooling direction and provide thereby for operation of said element at lower ambient temperatures uncompensated for ambient temperature changes.

8. A control device comprising a thermally responsive element, current responsive means for heating said element, a member formed of bimetallic thermostatic material operated by said element, circuit controlling means operated by said member in response to a predetermined current in said heating means, said member being arranged to be distorted by changes in ambient temperature to offset movement of said element in response to changes in ambient temperature, and means cooperating with said member at a predetermined low ambient temperature to limit its movement in a cooling direction and provide thereby for operation of said element at lower ambient temperatures uncompensated for ambient temperature changes, said means being arranged to limit the movement of said second device at the ambient temperature at which the compensated and uncompensated operating current values for said element are substantially equal.

9. A control device comprising a current conducting thermally responsive element in the form of a winding, an energizing winding disposed in inductive relation with said thermally responsive element for inducing a heating current in said element, an arm formed of bimetallic thermostatic material carried by said thermally responsive element, circuit controlling means operated by said arm, said arm being arranged to be distorted by changes in ambient temperature to offset movement of said arm by said thermally responsive element, and stop means movable with said thermally responsive element cooperating with said arm at a predetermined low ambient temperature to limit its movement in a cooling direction and provide thereby for operation of said thermally responsive element at lower ambient temperatures uncompensated for ambient temperature changes.

MYRON B. MARSHALL, Jr.